UNITED STATES PATENT OFFICE.

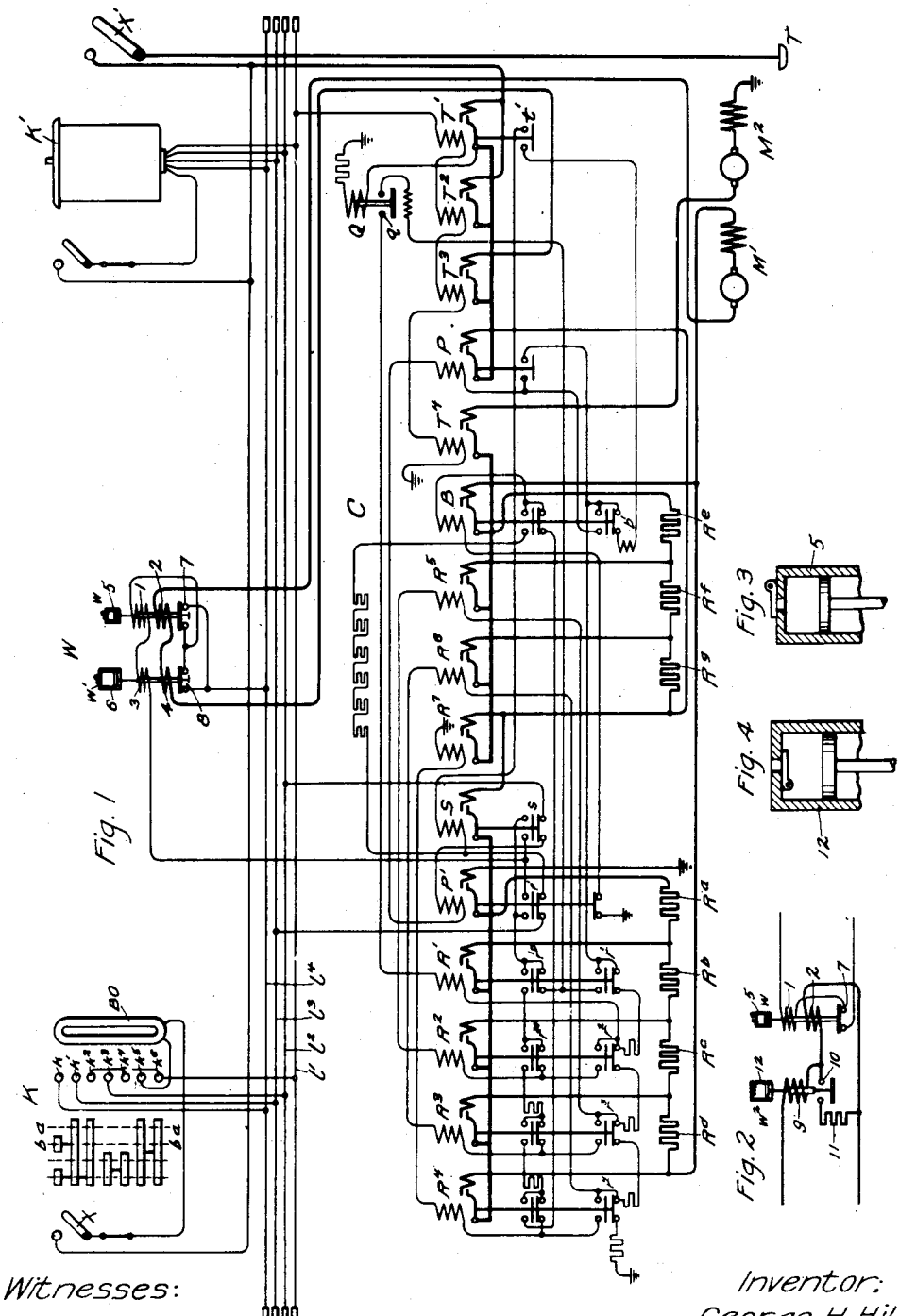

GEORGE H. HILL, OF SCHENECTADY, NEW YORK, ASSIGNOR TO GENERAL ELECTRIC COMPANY, A CORPORATION OF NEW YORK.

AUTOMATIC MOTOR-CONTROL APPARATUS.

No. 872,515.   Specification of Letters Patent.   Patented Dec. 3, 1907.

Application filed May 21, 1906. Serial No. 317,888.

*To all whom it may concern:*

Be it known that I, GEORGE H. HILL, a citizen of the United States, residing at Schenectady, county of Schenectady, State of New York, have invented certain new and useful Improvements in Automatic Motor-Control Apparatus, of which the following is a specification.

In Patent No. 798,342, granted on Aug. 29, 1905, on an application filed by me, I have disclosed a system of control comprising an automatic motor controller, together with a combined time-interval and throttle relay for controlling the operation of the automatic controller in such a manner that the current in the main circuit is maintained within safe limits. This relay comprises a shunt coil and a coil in series with the main circuit, and the system is arranged so that after each individual contact opens the relay is operated through the action of the shunt coil and is maintained in such operated position so as to prevent the closing of additional contactors until the current in the main circuit drops below a predetermined value. It is evident that, after the parts of the relay have once been adjusted, the relay stops the automatic progression of the contactors whenever the main current rises above a predetermined value and does not permit acceleration under greater currents. In electric railways, where such control systems are frequently used, the cars at times run on level stretches and at other times up or down inclines, and, in case a car is disabled, it must be moved out of the way by another car. Therefore, in practice, the setting of the relay is usually made such that the motors may be started under current having a value just below that which would cause the wheels to slip, whereby a disabled car may be pushed up hill by another car if necessary. The relay is then adjusted as to its time-interval feature so that when the car is on a level stretch of track a fairly smooth acceleration is obtainable by reason of the time interval function of the relay alone; this being made possible by reason of the fact that on light loads the motors start and accelerate rapidly, so that a counter-electromotive force is quickly established and thereafter quickly increased. It will be seen, however, that in starting the motors on a load which may be a normal load but sufficiently large to make starting slow,—as, for example, when a car is being accelerated on an incline under ordinary conditions,—the relay permits the controller to cut out resistance more rapidly than the counterelectromotive force of the motors increases. This is because the progression of the resistance-controlling contacts is controlled wholly by the relay acting as a time interval relay until the current reaches the abnormal maximum. Therefore, the value of the current supplied to the motor under such conditions is usually much greater than is necessary to set the car in motion; the motors being consequently subjected to unnecessarily severe treatment, and the car accelerated in a jerky and disagreeable manner.

The object of the present invention is to provide means whereby the governing device for controlling the automatic operation of the controller is made flexible, so as to automatically adjust itself to meet the requirements of different conditions of load.

The invention in its various aspects will be fully set forth and its objects and advantages will more clearly appear from the following detailed description taken in connection with the accompanying drawing, wherein:

Figure 1 indicates diagrammatically a control system comprising a motor controller of the separately-actuated contact type provided with a governing device arranged in accordance with the present invention; Fig. 2 is a diagram showing a somewhat modified form of governing device; and Figs. 3 and 4 are details of the dash-pots on the relays.

The invention will be described as operating in conjunction with a well-known form of controller used for service in electric railways, but it is of course not limited in its application to this particular situation or type of apparatus.

Reference being had to the drawings; $M^1$ and $M^2$ represent the motors of a two-motor car equipment; C indicates a motor controller of the separately-actuated contact type, including line contacts $T^1$, $T^2$, $T^3$ and $T^4$, resistance contacts $R^1$ to $R^7$, controlling the resistance sections $R^a$ $R^g$, a series contact S, parallel contacts P and $P^1$, and a bridging contact B. This controller, together with the relay Q, is identical with the corresponding apparatus shown in my Patent No. 815,826, of March 20, 1906 and a detailed description of the controller, except to such extent as may be necessary to make clear the operation of the present invention, is therefore unnecessary.

K and $K^1$ are master controllers connected in parallel to the train wires $l^1$—$l^4$ from which connections are made to the actuating coils of the controller.

W is the improved governing device for the group of automatically and progressively actuated contactors. This device consists of a relay $w$, corresponding to the relay O of Patent No. 815,826, and the relay E of Patent No. 798,342, together with a second somewhat similar relay $w^1$. On the relay $w$ is a coil 1 arranged in the actuating circuit of the group of automatically progressing contacts and a coil 2 arranged in the motor circuit. On the other relay are coils 3 and 4 corresponding, respectively, to and arranged in series with the coils 1 and 2 on the relay $w$. The relay $w$ is provided with a dash-pot 5 so proportioned that it requires but a short time—which, in an equipment of the character illustrated, may be about one-quarter of a second,—for the core of the relay to drop. The relay $w^1$ has a dash-pot 6 which makes the core of this relay drop much slower than that of the other, namely, in the case assumed, in about three seconds. The dash-pots 5 and 6 have outwardly opening check valves as indicated in Fig. 3. The relay $w$ is so proportioned that when the coil is deënergized and the current value in the coil 2 is not above the value best adapted for acceleration under the heavier normal loads,—which, in the case assumed, will be about 120 amperes,—the core of the relay is free to drop and close the relay contacts. The relay $w^1$, on the other hand, is so designed that after it has operated, the core begins to drop as soon as the motor current falls below a much higher value than that at which the other relay is free to close, namely, the value at which it is desired to accelerate under abnormal loads. When the setting of relay $w$ is 120 amperes. that of $w^1$ will be about 160 amperes. The operation of this controlling device or governor will be more fully understood in connection with a description of the operation of the motor controller.

Assuming that the main switch $X^1$ and the switch X adjacent the master controller K are closed, and that the controller is moved so as to bring its movable contacts into engagement with the row of fixed contacts along line $a$—$a$, current passes from current collector T, through the switches $X^1$, X blow-out coil BO, controller contact $k^5$, through the movable contacts of the controller, contact $k^6$, through train wire $l^1$, through the actuating coils of the line switches, to ground. A branch circuit extends from controller contact $k^6$, to contact $k^2$, thence through the movable contacts of the controller, to contact $k^1$, to train wire $l^3$, through the interlock $p^1$ associated with parallel contactor $P^1$, through the actuating coil of the series contactor S, through the interlock $t^1$ associated with the line contactor $T^1$, through the interlock $b^1$ associated with bridging contactor B, thence through the lower contacts of interlocks $r^1$, $r^2$, $r^3$ and $r^4$, to ground. Thus, the switches $T^1$, $T^2$, $T^3$, $T^4$ and S are closed and the motors are connected with the source of supply in series with each other and with the resistance sections $R^a$ to $R^g$. When the master controller is moved to its second position, namely, that in which the movable contacts engage with the fixed contacts along line $b$—$b$, the control circuits previously traced remain, and an additional branch passes from controller contact $k^2$ through the movable contacts of the controller, contact $k$, and thence to train wire $l^4$, through contacts 7 and 8 of the relays $w$ and $w^1$, respectively,—the contacts 7 and 8 being in parallel with each other,—thence through the coils 1 and 3 of the relays, through the upper contacts of the interlock $s$ associated with the series switch, through the lower contact of interlock $r^{10}$, through contact $q$ of relay Q, through the actuating coil of switch $R^1$, through the interlocks $r^2$, $r^3$ and $r^4$, to ground. Switch $R^1$ is accordingly closed, cutting resistance section $R^a$ out of the motor circuit, shunting its actuating circuit from the lower contacts of interlock $r^{10}$ to the upper contacts of this interlock,—so that an actuating current may thereafter flow through the upper contacts of interlock $r^{10}$, through the lower contacts of interlock $r^{20}$, and through the actuating coil of the resistance contactor $R^2$,—and shifting the actuating circuit for the series contactor from the lower contact of interlock $r^1$ to the upper contacts of this interlock so as to provide a maintaining circuit for the contactor $R^1$. In the meantime both relays have been lifted, interrupting the actuating circuit so that contact $R^2$ is not immediately closed.

If, upon the elimination of resistance section $R^a$, the motor current does not rise to a value sufficient to cause the throttle coil 2 to maintain the core of the relay $w$ raised, the core of the relay drops and again completes the actuating circuit, so that contactor $R^2$ may close. This is the operation on light loads, as when a car is started on a level stretch. If, however, the motor current rises slightly above the value necessary to maintain the relay $w$ lifted, then the interval of time during which the contact 7 remains open is increased, and, provided that the current diminishes sufficiently before the slow-moving core of the relay $w^1$ has completed its descent, the controlling action of the governor is still due entirely to the relay $w$, acting, however, in the dual capacity of a time-interval and throttle device. This latter is the normal operation of the governor when a fairly heavy load is placed upon the motors, as, for example, when the car is set in motion on an incline. The time setting of relay $w^1$ is made comparatively large in order that the throttle action of the other relay may take place most advantageously.

In operating a car under abnormal conditions, such as are met with in pushing a disabled car up hill, the current will rise to such a value that, not only is the relay $w$ held in its operated position, but the relay $w^1$ is also prevented from closing. The time elapsing between the closing of one contactor and the next is now longer than before, namely, it is equal to the time interval setting of the relay $w^1$ plus the time during which the motor remains above the minimum value which is sufficient to hold the core of the relay $w'$ up. In other words, as long as the motor current is maintained above the value of relay $w$ (120 amps.) for the length of time between steps that $w^1$ is set for—(3 secs.) the motors will be accelerated at the current rate of $w^1$ relay (160 amps.). Thus it will be seen that the governor adjusts itself automatically to provide a smooth acceleration under varying load conditions and at the same time permits the motors to take sufficient current to operate most advantageously without in any case being liable to be subjected to injuriously heavy currents. The remaining resistance contactors are closed in automatic succession, subject to the control of the governor W but, since the tracing of the various circuits whereby the resistance is all cut out of the motor circuit, the bridging connection formed, the motors again connected in parallel and then the resistance again removed, are not necessary to a clear understanding of the present invention, discussion thereof is omitted.

In Fig. 2 a modified form of governor is illustrated. The relay $w$ is the same as the relay $w$ in Fig. 1. The relay $w^2$, however, has but a single coil 9, this coil being arranged in the motor circuit. The contacts of this latter relay control a shunt about the coil 2 of the relay $w$, this shunt containing a resistance 11. The dash-pot 12 of the relay $w^2$ is arranged so as to permit the core of the relay to drop freely but retards its upward movement for a rather long period, say for four or five seconds. This dash-pot has an inwardly opening check valve as shown in Fig. 4. Under light loads the relay $w$ alone controls the operation of the contactors, acting as a time-interval device. When the load is that corresponding to the load on the motors when the car is going up hill, more current is taken and the core of the relay is held up through the action of the coil 2, until a safe value is reached. Under abnormally heavy loads the core of relay $w$ is held up until relay $w^2$ has time to act. Thereupon the resistance 11 is placed in shunt with the coil 2 and the effect of the motor current upon the relay $w$ diminished. Consequently at a predetermined current value the core of the relay $w$ will drop and the contactor-actuating circuit be completed. The governor in this instance prevents excessive currents from passing through the motor under abnormal load conditions for the reason that the resistance 11 is so proportioned that when the current of the motor circuit rises to a dangerous value, sufficient current will still flow through the coil 2 to hold the relay $w$ up, thereby preventing further reduction of the resistance in the motor circuit while the dangerous current lasts.

Although I have described my invention in detail as embodied in preferred forms, I do not desire to limit the invention to any particular form shown but in the appended claims aim to cover not only the particular forms shown but all the forms coming within the scope of the claims.

What I claim as new and desire to secure by Letters Patent of the United States, is,—

1. In combination, an electric circuit including a translating device, a controller for varying the conditions of said circuit, automatic actuating means for said controller, and an electroresponsive governor for automatically controlling the rate of operation of said actuating means to limit the current in said circuit to different predetermined values under different predetermined conditions of said translating device.

2. In combination, a motor, a speed controller, automatic actuating means for said controller, and an electroresponsive governor for automatically controlling the rate of operation of said actuating means to limit the motor current to differing values corresponding to differing loads.

3. In combination, a motor, a speed controller, automatic actuating means for said controller, and an electroresponsive governor for controlling the operation of said actuating means, said governor including a plurality of coils in the motor circuit and coöperating elements connected and arranged to govern the rate of operation of said actuating means to limit the motor current to a predetermined value on a certain load and to limit the current to a different predetermined value on a different load.

4. In combination, a motor, a controller for varying the resistance of the motor circuit, automatic actuating means for said controller, and an electroresponsive governor for automatically controlling the rate of operation of said actuating means to limit the motor current to differing values corresponding to differing loads.

5. In combination, a motor, a controller including a plurality of individual contacts for varying the conditions of the motor circuit, actuating means for said contacts arranged to actuate the contacts in automatic succession, an electroresponsive governor for said actuating means arranged to control the rate of progression of said contacts to limit the motor to a predetermined value on a certain load and to a different value on a different load.

6. In combination, a motor, a controller for varying the conditions of the motor circuit, automatic actuating means for said controller, and an electroresponsive governor for said actuating means arranged to cause the controller to be operated at a predetermined rate at certain loads and to vary the rate of operation of the controller so as to limit the motor current to differing values at certain other and differing loads.

7. In combination, a motor, a resistance, a controller comprising contacts arranged to vary the amount of said resistance in the motor circuit, automatic actuating means for said controller, and an electroresponsive governor for said actuating means having coils in the motor circuit and controlling said actuating means so that the said resistance is eliminated from the motor circuit at a predetermined rate during certain loads and during certain other differing loads at a rate or rates limiting the motor current to predetermined differing values.

8. In combination, an electric circuit including a translating device, a controller for varying the conditions of said circuit, means for automatically actuating said controller step by step, and a plurality of combined throttle and time-interval relays having different settings for controlling the controller-actuating means.

9. In combination, an electric circuit, a controller for varying the conditions of said circuit, means for automatically actuating said controller step by step, and a plurality of relays operating in parallel to govern the operation of said controller-actuating means, said relays each having a coil arranged in said circuit and the settings of the relays being different.

10. In combination, an electric circuit, a controller for varying the conditions of said circuit, means for automatically actuating said controller step by step, and a plurality of combined time-interval and throttle relays for governing the controller-actuating means, said relays operating in parallel with each other and having corresponding coils connected in series with each other.

11. In combination, an electric circuit, a controller for varying the conditions of said circuit, means for automatically actuating said controller step by step, and a plurality of combined time-interval and throttle relays for governing the controller-actuating means, said relays having different settings and operating in parallel with each other.

12. In combination, a motor, a controller for varying the conditions of the motor circuit, means for automatically actuating said controller step by step, and a plurality of combined time-interval and throttle relays operating in parallel with each other to govern the operation of said controller-actuating means.

13. In combination, a motor, a controller for varying the conditions of the motor circuit, electroresponsive means for automatically actuating said controller step by step, and a plurality of combined time-interval and throttle relays operating in parallel to control the circuit of said electroresponsive means, said relays having different settings.

14. In combination, a motor, a controller for varying the conditions of the motor circuit, electroresponsive means for automatically actuating said controller step by step, and a plurality of combined time-interval and throttle relays operating in parallel to control the circuit of said electroresponsive means, said relays having corresponding coils connected in series with each other and the setting of the relays being different.

15. In combination, a motor, a controller for varying the conditions of the motor circuit, electroresponsive means for automatically operating said controller step by step, a control circuit for said electroresponsive means, and a plurality of combined time-interval and throttle relays actuating contacts in said control circuit to check the operation of the said electroresponsive means.

16. In combination, a motor, a controller for varying the conditions of the motor circuit, electroresponsive means for automatically operating said controller step by step, a control circuit for said electroresponsive means, and a plurality of combined time-interval and throttle relays actuating contacts in said control circuit to check the operation of the said electroresponsive means, said relays having different settings and the arrangement being such that all of the relays are actuated at each step of the operation of the controller.

17. In combination, a motor, a controller for varying the condition of the motor circuit, means for automatically actuating said controller step by step, a plurality of relays operating to control the operation of said controller actuating means, and means for operating said relays at each step of the operation of the controller, said relays having throttle coils arranged to maintain the different relays in the operated positions under different values of motor current.

18. In combination, a motor, a controller for varying the condition of the motor circuit, means for automatically actuating said controller step by step, a plurality of relays operating in parallel to control the operation of said actuating-means and means for operating said relays at each step of the operation of the controller, said relays having throttle coils for maintaining the different relays in the operated positions under different values of motor current, and checking devices having differing settings associated with said relays.

19. In combination, a motor, a controller for varying the condition of the motor circuit, means for automatically actuating said controller step by step, a control circuit for said actuating means, a plurality of relays having contacts in said control circuit, means for operating said relays to open said contacts at each step of the operation of said controller, throttle coils on said relays arranged to hold the different relays in the operated positions under different values of motor current, and checking devices associated with certain of the relays and arranged to retard the closing movement of the relay having the highest current setting to a greater extent than the relay having the lowest current setting.

20. In combination, a motor, a controller for varying the condition of the motor circuit, electroresponsive means for automatically actuating said controller step by step, a control circuit for said electroresponsive means, a plurality of relays having contacts arranged in parallel in said control circuit, means for operating the said relays to open said contacts at each step of the operation of said controller, throttle coils on said relays arranged to hold the relays in the operated positions under different values of current in the motor circuit, and dash-pots on said relays for retarding the movement of the relays to the circuit closing position, the dash-pot on the relay having the highest current setting being arranged to retard its relay more than the dash-pot which is connected to the relay having the lowest current setting.

21. In combination, a motor, a motor-controller comprising a plurality of individual switches arranged to operate in automatic succession, an actuating circuit for said switches, a pair of relays having contacts arranged in parallel with each other in said actuating circuit and having lifting coils connected in said actuating circuit, means associated with each of said switches for shifting the actuating circuit to a following switch, throttle coils on said relays arranged to hold said relays in the lifted positions under different values of motor current, and a dash-pot on the relay having the higher current setting arranged to cause its delay.

In witness whereof, I have hereunto set my hand this 19th day of May, 1906.

GEORGE H. HILL.

Witnesses:
BENJAMIN B. HULL,
HELEN ORFORD.